Dec. 1, 1925.

E. R. CLAYTON ET AL 1,563,892

DISK CLUTCH STRUCTURE

Filed March 5, 1925

INVENTOR.
Amos H. Kirksey
BY Earl R. Clayton
Nestall and Wallace
ATTORNEYS.

Patented Dec. 1, 1925.

1,563,892

UNITED STATES PATENT OFFICE.

EARL R. CLAYTON AND AMOS H. KIRKSEY, OF LOS ANGELES, CALIFORNIA.

DISK-CLUTCH STRUCTURE.

Application filed March 5, 1925. Serial No. 13,394.

*To all whom it may concern:*

Be it known that we, EARL R. CLAYTON and AMOS H. KIRKSEY, citizens of the United States, and residents of Los Angeles, in the county of Los Angeles, State of California, have invented new and useful Improvements in a Disk-Clutch Structure, of which the following is a specification.

This invention relates to a disk clutch adapted to be mounted upon the fly wheel of an automobile of a well known type. The present invention appertains to a disk clutch unit which may be substituted for a cone clutch forming an element of certain well known automobiles. The type of car referred to is built in a manner such that standard clutches cannot be substituted without much alteration of the parts, making the installation expensive and laborious.

The primary object of this invention is to provide a structure of the character described, which is economical to manufacture, easy to install, compact, and requires no alterations of the parts upon which it is mounted, and to which it is attached.

Figure 1:
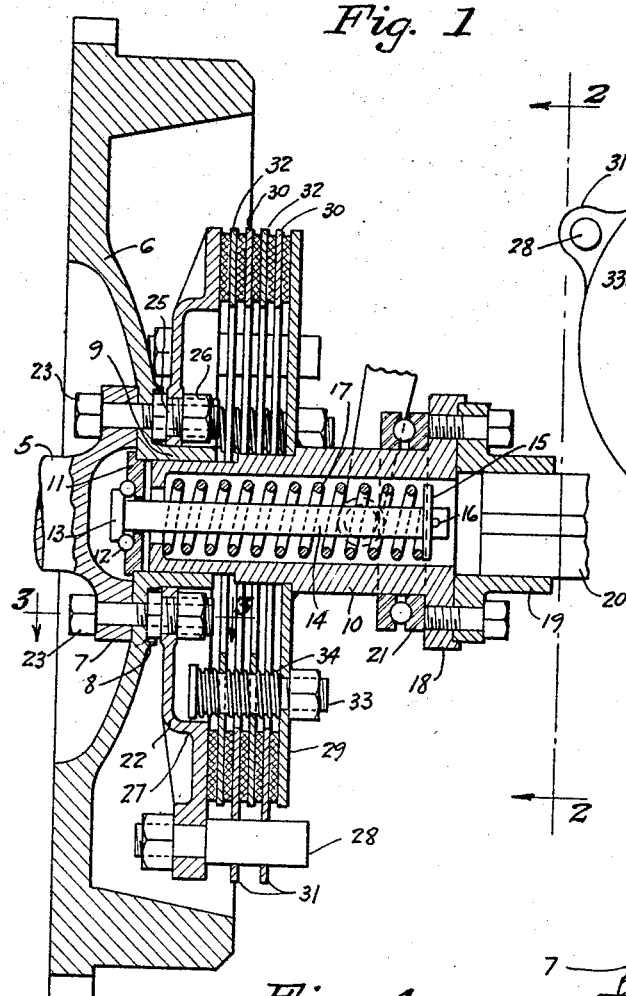
Figure 2:
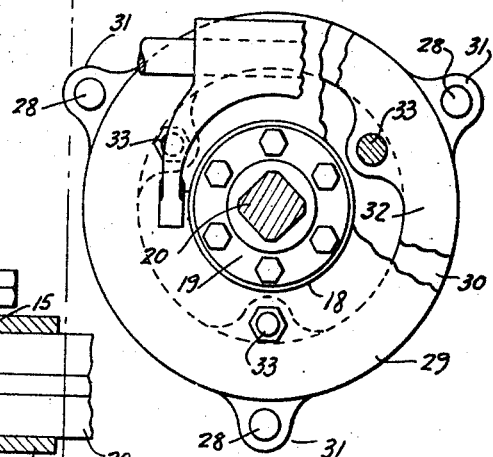
Figure 3:
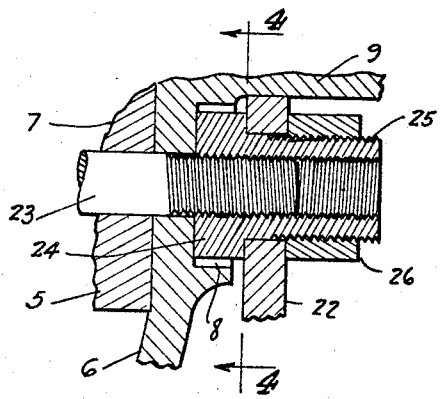
Figure 4:
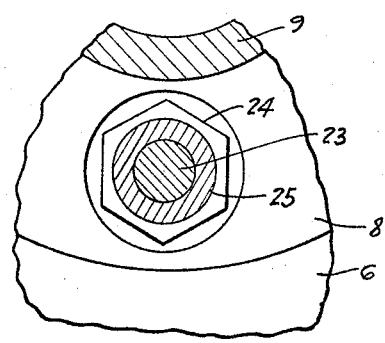

These objects together with other objects and corresponding accomplishments are obtained by means of the embodiment of our invention illustrated in the accompanying drawing, in which:

Fig. 1 is an axial section through a clutch mounted in position; Fig. 2 is a fragmentary view as seen on the line 2—2 of Fig. 1; Fig. 3 is a view in section as seen on the line 3—3 of Fig. 1 showing a fragment of the structure on an enlarged scale and Fig. 4 is a section as seen on the line 4—4 of Fig. 3.

Referring more particularly to the drawing, 5 indicates the crankshaft of an engine to which the fly wheel 6 is secured by means of suitable bolts. In the type of device shown, the fly wheel 6 forms the female element of the cone clutch. It is secured to the crank shaft by means of bolts extending through registering bolt holes in the flange 7 on the end of the crank shaft and bolt holes in the fly wheel adjacent the hub, these bolt holes opening into an annular recess formed between the hub of the wheel and an annular rib 8. The nuts on the bolts are thus inset. A hub 9 forming a part of the fly wheel slidably receives a clutch shaft 10. A race plate 11 for the balls 12 of a ball bearing is provided. The cooperating race is indicated by 13 and is mounted upon the end of a stem 14 slidably mounted within the bore of shaft 10. At the other end of the stem 14 is a washer or ring 15 removably held in position by a pin 16. A compression spring 17 is mounted between the washer 15 and the shoulder at the inner end of shaft 10. The construction is such as to tend to hold the shaft 10 in its inner position upon the fly wheel. The general construction just described is the standard employed in the automobile referred to, the male clutch element being mounted upon the shaft 10. The shaft 10 has a flange 18 at its outer end to which is secured a collar 19 slidably receiving the square end of a propeller shaft 20. The construction just described is such that the clutch shaft 10 may be moved axially a limited distance, toward the propeller shaft 20 and against the action of spring 17, when released, spring 17 tending to move the clutch shaft back into the fly wheel.

A suitable clutch collar 21 for moving the clutch shaft is employed. The construction is such that the shaft 10 may rotate within the fly wheel and be slidably moved outwardly against the action of spring 17. In order to rotate propeller shaft 20, shaft 10 should be clutched in some manner to the fly wheel structure. In the present structure, we have employed a disk clutch peculiarly constructed to adapt it for mounting upon the structure just described.

A plate 22 has a central opening adapting it to be slipped over the hub 9 on the fly wheel. It is provided with bolt holes registering with the bolt holes in the fly wheel. However, the bolt holes are of much larger diameter. The bolts 23 extending through the fly wheel are those installed with the cone clutch. As installed, the bolt heads are on the inner side of the fly wheel in such a position that they are difficult of removal. When the cone clutch is assembled, the bolts remain in position in the fly wheel and these bolts are employed in mounting our disk clutch thereon. Each collar head 24 has a threaded bore adapted for mounting it upon the bolt shank 23, as best shown in Fig. 3. This bolt head collar is conveniently provided with a wrench hold of hexagonal shape at the base and is reduced in diameter at the outer end, this end being cylindrical. The outer end is externally threaded and adapted to receive a nut 26.

Collar heads 24 are drawn tightly up against the fly wheel 6, securely holding the latter in position upon the crank shaft. The plate 22 is then mounted upon the cylindrical part of the collar heads, and the nut 23 drawn up tightly so that the plate 22 is secured to the fly wheel through the collar heads resting upon the shoulders of the latter. The plate 22 is offset axially to provide an annular shoulder 27. Extending from the periphery of the plate are three ears, and mounted in openings in the ears are bolt pins 28. Mounted upon the pins 28 are inner disk plates 30. These plates have ears 31 with openings to receive the pins 28, thereby securing the plates to the fly wheel structure and compelling rotation therewith. Intermediate the inner plate 22 and a plate 30 is a disk plate 32. Similar plates 32 are placed between plates 30 and the outer plate 29 to prevent rotation of the shaft 10. Mounted upon the plate 29 are pins 33 suitably held thereto by means of bolts and slidably extending through plates 32. Mounted about each pin 33 and between adjacent plates of the same group are springs 34. These springs tend to hold the plates apart so that they disengage easily and also prevent rattling, as the plates 32 are loosely mounted in position.

The operation of the clutch is obvious. Means is provided for communicating axial movement to clutch collar 21. The spring 17 within the shaft 10 normally tends to hold the clutch plates in engagement, thereby clutching the shaft 10 to the fly wheel and crank shaft. Movement of the clutch collar tending to move the shaft 10 outwardly with respect to the fly wheel releases the pressure between the plates, the springs 34 assisting in disengagement. The shaft 10 is thereby declutched from the fly wheel 6. The installation of the clutch is obvious, the male clutch member and shaft upon which it is mounted, being removed, the disk clutch with its similar clutch shaft then being substituted in position.

What we claim is:

1. In an automobile, the combination of an engine shaft having a fly wheel receiving flange at the end thereof provided with bolt holes; a fly wheel therefor, said fly wheel having a hub and a web with bolt holes extending therethrough; bolts extending through the bolt holes in said fly wheel and flange; shouldered collar heads threaded on said bolts, said collar heads having externally threaded ends; a clutch disk holding plate mounted over said collar heads and abutted against the shoulders thereon; nuts mounted on said collar heads securing said plate to said fly wheel; clutch disk mounted on said plate and held against rotation; a hollow clutch shaft slidably mounted in said fly wheel; a spring within said shaft tending to hold said shaft in its inner position in said hub, said shaft being arranged to be splined to a propeller shaft; and clutch disks secured against rotation with respect to said clutch shaft.

2. In an automobile, the combination of an engine shaft having a fly wheel receiving flange at the end thereof provided with bolt holes; a fly wheel therefor, said fly wheel having a hub and a web with bolt holes extending therethrough; bolts extending through bolt holes in said fly wheel and flange; shouldered collar heads threaded on said bolts, said collar heads having externally threaded ends; a clutch disk holding plate mounted over said collar heads and abutted against the shoulders thereon, nuts mounted on said collar heads securing said plate to said fly wheel; clutch disks mounted on said plate and held against rotation; a shaft to be clutched to said fly wheel; and clutch disks secured against rotation with respect to said shaft.

In witness that we claim the foregoing we have hereunto subscribed our names this 27th day of February, 1925.

EARL R. CLAYTON,
AMOS H. KIRKSEY.